Aug. 10, 1926.

M. F. ROSE

STENOGRAPHER'S SCALE

Filed March 11, 1925

1,595,422

INVENTOR.
Manuel F. Rose
BY M. C. Frank
ATTORNEY.

Patented Aug. 10, 1926.

1,595,422

UNITED STATES PATENT OFFICE.

MANUEL F. ROSE, OF OAKLAND, CALIFORNIA.

STENOGRAPHER'S SCALE.

Application filed March 11, 1925. Serial No. 14,743.

My invention relates to scales, and more particularly to scales for the use of stenographers and others, and which scale is to be used in association with typewritten work or work to be typewritten.

My Patent No. 1,528,992, issued March 10, 1925, pertains to the same subject matter, but the present improvement differs therefrom primarily insomuch that it is not intended for attachment to the typewriter.

An important object of the invention is the provision of a flat scale for desk use, having simple numbered graduations thereon for applying to typewritten work, in which the work is to be copied or reproduced on a typewriter and in the center of the page, the scale indicating to the stenographer or user at which number on the scale of the typewriter to start the carriage for the desired central positioning of the work on the said page.

Another important object is to copy or reproduce work on the typewriter and in the center of the page that has not been previously typewritten, the scale again indicating to the user thereof where to start the carriage of the typewriter. In this case the number of letters in the work plus the spaces between the words determines the indicating number for starting, while in the former case the scale is laid above the typewritten work and the terminal letter or character of the work determines the indicating number on the scale for starting, and which will be fully brought out as the description of the invention proceeds.

A further object embodied in the parent idea of my invention is to provide separate scales of the character referred to for typewriters having different type, such as 80 space "pica" type, 90 space "elite" type, 100 space "pica" type or other graduated type.

With the above and other objects in view, my invention consists in certain novel features of construction, form and arrangement of elements. The accompanying sheet of drawings forming a part of this specification, illustrates an embodiment of my invention, and what I claim as new, is particularly pointed out in the appended claims following this specification.

Figure 1:
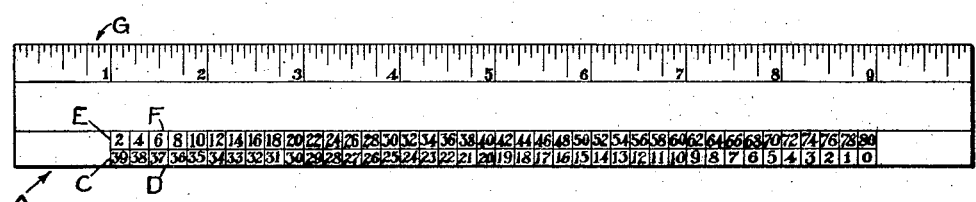
Figure 2:
Figure 3:
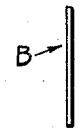

Figure 1 of the said drawings is a plan of the scale formed as a part of the familiar ruler; Fig. 2 is an end view of it, and Fig. 3 an end view of a scale of modified shape and much thinner than the strip of Fig. 2.

The scale consists of a strip A of any suitable material such as boxwood and shaped as desired, or it may be made of a relatively thin strip B of celluloid or steel.

The letter C represents a row of graduations of predetermined length, and contains a definite number of blocked-off spaces D, all of which spaces are the same size. In this instance the length of the row is 8 inches, and contains 40 blocked-off spaces and the length of each space is equivalent to two letter or character spaces of any typewriter having "pica" type. The scale illustrated in Fig. 1 is for a typewriter of 80 space "pica" type, such for example as the present No. 12 "Remington" typewriter.

In each of the spaces D is a number, beginning with 0 at the right end of the row and terminating at the left end with number 39. The series of numbers is consecutive and increases by the addition of 1 each time.

The said row C is preferably along the lower edge of the scale. Immediately above and in transverse alignment with row C is a second longitudinal row E, similar in all respects to row C except as to the numbering of the blocked-off spaces F and the direction of the said numbering. In each of the spaces F is a number, beginning with 2 at the left end of the row and terminating at the right end with number 80. This series of numbers is also consecutive and increases by the addition of 2 each time.

Along the upper edge of the scale may be laid off the standard rule G of the inch measure and fractions thereof. This rule is simply a feature of convenience, and forms no essential cooperative element of the invention.

To attain the objects of the invention by the use of my scale, the application of it is as follows: Place the left end of the lower row of the scale over the typewritten heading, group of words or other work that is in question and before one, and note the number on said row C appearing directly above the last letter or character. This number indicates where to start the carriage on the typewriter for positioning the said work in the center of the page. Of course it is assumed that the paper is first placed central in the machine. If the work in question is not typewritten, count the letters, spaces and any characters, and if the number is odd, add 1, and find this number on the top longitudinal row E and note the number appearing directly therebelow on row C. This final number indicates where to start the carriage to accomplish the desired object as in the previously mentioned example.

For other graduated type as referred to in the objects of the invention, the rows C and E are made correspondingly longer or shorter with more or less blocked-off spaces of sizes to suit the character of type of the typewriter desired, and the said spaces numbered similarly as in the present illustrated and described case. For 90 space "elite" type, the highest number in the top row will be 90, and in the lower row 44. And similarly for 100 space "pica" type, the highest number in the top row will be 100, and in the lower row 49.

Having thus illustrated and described my invention in the form adaptable for use with most makes of typewriters on the market, I wish it understood that the same may be modified to suit typewriters having a different number of characters to the line. Therefore, the patent protection that I desire, is all of that which comes within the spirit and scope of the invention as claimed.

I claim:

1. A scale of the class described, comprising a strip of material having thereon two longitudinal rows of numbers, the rows being of predetermined and equal length and having the same number of numbers, one of the rows being above the other and the lower of said rows numbered from 0 consecutively by ones to the end of the row, and the upper of said rows numbered from 2 consecutively by twos to the end of the row, the lowest number in the upper row being above the highest number in the lower row, and one of said rows being numbered from right to left and the other from left to right.

2. A stenographer's scale, comprising a strip of material having thereon two longitudinal rows of blocked spaces, the rows being of predetermined and equal length and having the same number of equally blocked spaces, one of the rows being along an edge of the strip and the other directly thereabove, the lower of said rows having a number in each blocked space beginning with 0 and continuing consecutively by the addition of 1 each time, and the upper of said rows also having a number in each blocked space and beginning with 2 and continuing consecutively by the addition of 2 each time, the blocked space with the lowest number in the upper row being above the blocked space with the highest number in the lower row, and one of said rows being numbered from right to left and the other from left to right.

In testimony whereof I affix my signature.

MANUEL F. ROSE.